ര
3,088,968
POLYCYANO-4,7-DITHIA-2,5-HEPTADIENES

Robert D. Vest, Wilmington, Del., assignor to E. I. du Pont de Nemours and Company, Wilmington, Del., a corporation of Delaware
No Drawing. Filed May 9, 1960, Ser. No. 27,502
13 Claims. (Cl. 260—465.5)

This invention is concerned with, and has as its principal objects provision of, a new class of polynitrile-containing unsaturated organic acids and their salts and a method for the preparation of the same The polycyano-4,7-dithia-2,5-heptadienes involved in this invention are highly ionized acids which react readily with bases to yield the corresponding salts. The anions of these acids and salts are comprised substantially of carbon, nitrogen, and sulfur in a unique structure possessing a high degree of unsaturation which is present as multiple conjugated systems formed by a plurality of cyano groups bonded to ethylenically unsaturated aliphatic carbon atoms.

This invention provides as new compounds the 1,1-disubstituted - 2,3,5,6-tetracyano-4,7-dithia-2,5-heptadienes and the corresponding 1,7-diide salts, and a process for the preparation of the alkali metal salts by the reaction of an alkali metal derivative of an active methylene compound with tetracyano-1,4-dithiin. Other salts as well as the corresponding free acids are prepared from the alkali metal salts by metathesis.

The 1,1-disubstituted - 2,3,5,6-tetracyano-4,7-dithia-2,5-heptadienes and their salts may be represented by the formula:

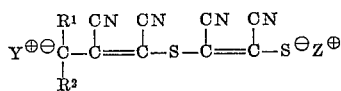

where $R^1$ and $R^2$ are electronegative groups and Y and Z are cations.

The electronegative groups represented by $R^1$ and $R^2$ are those groups having sufficient electronegativity to make possible the formation of an alkali metal derivative of a methylene group carrying any two of them, alike or different. Thus, $R^1$ and $R^2$ may be —CN, —COOR, —COR, —C$_6$H$_5$, —CNH$_2$=C(CN)$_2$, —NO$_2$, or

—SO$_2$C$_6$H$_5$ where R is hydrogen or a saturated alkyl group, suitably containing 20 carbon atoms or less.

The cations represented by Y and Z may be hydrogen; one equivalent of a metal, e.g., an element having an atomic number of 3, 4, 11–13, 19–32, 37–51, 55–84, and 87 and above; an ammonium or lower alkyl-substituted ammonium cation; a sulfonium or lower alkyl-substituted sulfonium cation; and the like.

When a 1,1-disubstituted-2,3,5,6-tetracyano-4,7-dithia-2,5-heptadiene free acid reacts with one equivalent of a base, the proton which is replaced in forming the resulting acid salt is the one associated with position 1, e.g., on the carbon atom. Further reaction with a second equivalent of a base replaces the proton at position 7, e.g., on the sulfur, with a cation to yield the normal salt.

The process of this invention may be illustrated as follows:

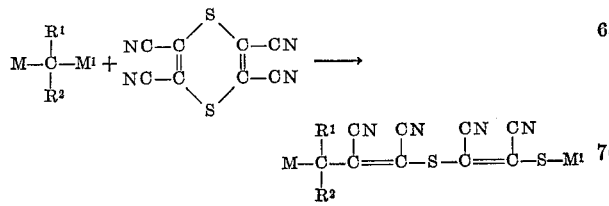

where M is an alkali metal, e.g., Li, Na, K, Rb, and Cs, $M^1$ is hydrogen or an alkali metal, and the R's are as defined above.

The reactivity of the alkali metal derivatives of the active methylene compounds toward water make it preferable to carry out the process of this invention in the substantial absence of water. The process may be carried out simply by bringing the reactants into intimate contact as by mixing, grinding, and the like, and allowing the mixture to stand at room temperature until a 1,1-disubstituted - 2,3,5,6 - tetracyano-4,7-dithia-2,5-heptadiene-1,7-diide is formed. To facilitate completion of the reaction in a reasonable time, it is preferred to carry out the process in the presence of an anhydrous liquid diluent which is inert to the reactants and products. Suitable inert media include the ethers such as tetrahydrofuran, dimethoxyethane, and diethyl ether, the hydrocarbons such as benzene, toluene, cyclohexane, heptane, and decalin and similar inert liquids.

As illustrated in Examples I and III below, the process of this invention may be carried out at room temperature. Temperatures far below room temperature, e.g., —80° C. and below, and far above room temperature, e.g., 300° C. and above, are also operable. It is generally preferred to operate in the range from 0 to 100° C.

Pressure is not critical in the process of this invention and pressures above and below atmospheric pressure may be employed.

Tetracyano-1,4-dithiin,

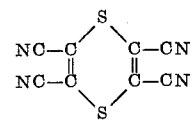

alternatively named 1,4-dithia-2,3,5,6-tetracyanocyclohexa-2,5-diene, for use in this invention may be prepared as follows:

To a stirred and cooled suspension of 22.2 parts of 1,2-dicyano-1,2-disodiothioethylene [Bähr and Schleitzer, Ber. 90, 438 (1957)] in 350 parts of 1,2-dimethoxyethane is added 17.4 parts of dichloromaleonitrile. An exothermic reaction occurs and the mixture turns deep red in color. Stirring is continued at room temperature for 72 hours. The suspended solid material, consisting largely of sodium chloride and sulfur, is removed by filtration and washed with a little 1,2-dimethoxyethane. The filtrate and washings are combined and evaporated to dryness under nitrogen. The remaining solid is extracted with 500 parts of warm benzene, giving a solution and a crystalline solid residue sparingly soluble in benzene. The crystalline solid is separated by filtration and sublimed at 140–150° C. and 1 mm. pressure to give 6 parts of tetracyano-1,4-dithiin, M.P. 196–198° C. Recrystallization from hot benzene gives 5.5 parts of purified material, M.P. 207–208° C.

In the following examples parts are by weight unless otherwise indicated. Example I represents a preferred embodiment.

EXAMPLE I

To a solution of 66 parts of dry malononitrile in 8,880 parts of dry tetrahydrofuran under a blanket of nitrogen is added 48 parts of a 50% dispersion of sodium hydride in mineral oil. After the evolution of hydrogen ceases, the resulting solution of sodiomalononitrile is stirred for 20 minutes. A solution of 108 parts of tetracyano-1,4-dithiin in 3,552 parts of dry tetrahydrofuran is added over a period of 30 minutes at room temperature. The mixture is stirred for ten minutes, and volatile material is then removed by evaporation. The resulting disodium 1,1,2,3,5,6-hexacyano-4,7-dithia-2,5-heptadiene - 1,7 - diide is dissolved in 3,000 parts of water. The addition of excess tetramethylammonium chloride causes precipitation of 140 parts of bis(tetramethylammonium) 1,1,2,3,5,6-hexacyano-4,7-dithia-2,5-heptadiene-1,7-diide in the form of a yellow-orange solid which melts at 215° C. with decomposition. The compound is recrystallized from absolute alcohol. The infrared absorption spectrum shows bands at 10.55, 6.73, 6.65, 4.59, 4.54, 3.4, and 3.3 microns. The ultraviolet absorption spectrum shows peaks at 4,070, 2,500, and 2,150 A. with molecular extinction coefficients of 22,200, 10,000, and 20,400, respectively:

*Analysis.*—Calcd. for $C_{19}H_{24}N_8S_2$: C, 53.19%; H, 5.65%; N, 26.18%; S, 14.98%. Found: C, 53.00%; H, 5.45%; N, 25.51%; S, 14.72%.

EXAMPLE II

A solution of 10 parts of tetramethylammonium 1,1,2,3,5,6-hexacyano - 4,7 - dithia-2,5-heptadiene-1,7-diide in 1,566 parts of acetonitrile, i.e., in liquid phase, is passed through an ion-exchange column containing an ion-exchange resin in acid form ("Amberlite" IR–120H; see U.S. Patent 2,901,398). The eluent is mixed with 3,518 parts of benzene. The resulting solution is frozen at —80° C. and the solvents removed by sublimation at about this temperature and at 0.1 mm. pressure. There is obtained 7.6 parts of 1,1,2,3,5,6-hexacyano-4,7-dithia-2,5-heptadiene in the form of a brown solid melting at 150–155° C. The infrared absorption spectrum shows bands at 6.67, 6.55, 6.13, 4.55, 4.48, 3.08, and 2.95 microns. An aqueous solution of this acid has a pH of about 3.

EXAMPLE III

In a glass reactor protected from the atmosphere by a blanket of nitrogen is placed 12 parts of ethyl cyanoacetate in 1,776 parts of dry tetrahydrofuran and 10 parts of a 50% dispersion of sodium hydride in mineral oil. After the vigorous reaction subsides, the mixture is heated to 50° C. and stirred for ½ hour. A solution of 22 parts of tetracyano-1,4-dithiin in 444 parts of tetrahydrofuran is slowly added. The solution turns first orange and then brown in color with the formation of disodium 1 - ethoxycarbonyl - 1,2,3,5,6-pentacyano-4,7-dithia-2,5-heptadiene-1,7-diide. After stirring an additional 15 minutes, the volatile material is removed under diminished pressure. Solid residue is taken up in 200 parts of water, and this aqueous solution is slowly added with stirring to a solution of 34 parts of silver nitrate in 2,000 parts of water. Di-silver 1-ethoxycarbonyl-1,2,3,5,6-pentacyano-4,7-dithia-2,5-heptadiene-1,7-diide is formed as a brown solid which is collected on a filter, dried, and found to melt with decomposition at 140–165° C. The infrared absorption spectrum shows bands at 5.99, 4.55, and 3.55 microns. The ultraviolet absorption spectrum shows maxima at 4,280, 3,550, 2,550, and 2,300 A. with molecular extinction coefficients of 10,500, 15,300, 14,000, and 18,000, respectively.

*Analysis.*—Calcd. for $Ag_2C_{13}H_5N_5O_2S_2$: C, 28.75%; H, 0.93%; N, 12.90%; S, 11.82%. Found: C, 26.50%; H, 1.26%; N, 11.86%; S, 10.60%.

EXAMPLE IV

Bis(benzenesulfonyl)methane is converted to its sodium salt by reaction of 30 parts of the bismethane with 10 parts of a 50% dispersion of sodium hydride in mineral oil in solution in 1,776 parts of tetrahydrofuran under anhydrous conditions. A solution of 22 parts of tetracyano-1,4-dithiin in 444 parts of dry tetrahydrofuran is then added at room temperature over a period of 20 minutes. The solution turns deep red-orange in color. After an additional ½ hour of stirring at room temperature, the solution is evaporated to dryness. The resulting di-sodium 1,1-di(benzenesulfonyl)-2,3,5,6-tetracyano-4,7-dithia-2,5-heptadiene-1,7-diide is dissolved in about 300 parts of water and an excess of tetramethylammonium chloride is added. A precipitate of 23 parts of bis(tetramethylammonium) 1,1-di(benzenesulfonyl)-2,3,5,6-tetracyano-4,7-dithia-2,5-heptadiene-1,7-diide is obtained in the form of a dark orange solid which melts with decomposition at about 160° C. The infrared absorption spectrum shows bands at 10.55, 8.75, 7.55, 6.7, 6.35, 4.5, and 3.3 microns. The ultraviolet light absorption spectrum shows maxima at 3,000, 2,670, 2,540, and 2,470 A. with molecular extinction coefficients of 18,400, 42,500, 16,400, and 53,500, respectively.

*Analysis.*—Calcd. for $C_{29}H_{34}S_4O_4N_6$: C, 52.9%; H, 5.2%. Found: C, 54.8%; H, 4.1%.

When the active methylene compounds indicated in the first column of the table below are substituted for malononitrile in the procedure of Example I, the sodium 1,7-diide salts of the 2,3,5,6-tetracyano-4,7-dithia-2,5-heptadienes indicated in the second column of the table are obtained.

Table

| Active Methylene Compound | Product: Di-sodium 1,7-diide Salt of— |
|---|---|
| diethyl malonate | 1,1-di(ethoxycarbonyl)-2,3,5,6-tetracyano-4,7-dithia-2,5-heptadiene. |
| acetyl acetone | 1,1-diacetyl-2,3,5,6-tetracyano-4,7-dithia-2,5-heptadiene. |
| phenylacetonitrile | 1,2,3,5,6-pentacyano-1-phenyl-4,7-dithia-2,5-heptadiene. |
| ethyl ester of phenylacetic acid | 1-ethoxycarbonyl-1-phenyl-2,3,5,6-tetracyano-4,7-dithia-2,5-heptadiene. |
| ethyl acetoacetate | 1-acetyl-1-ethoxycarbonyl-2,3,5,6-tetracyano-4,7-dithia-2,5-heptadiene. |
| dinitromethane | 1,1-dinitro-2,3,5,6-tetracyano-4,7-dithia-2,5-heptadiene. |
| malononitrile dimer | 1-(1-amino-2,2-dicyanovinyl)-1,2,3,5,6-pentacyano-4,7-dithia-2,5-heptadiene. |

When the sodium salts of the 1,1-disubstituted-2,3,5,6-tetracyano-4,7-dithia-2,5-heptadienes shown above are treated with an acidic ion-exchange resin ("Amberlite" 120; "Dowex" 50) by the procedure of Example II, the free acid forms of the corresponding 1,1-disubstituted-2,3,5,6-tetracyano-4,7-dithia - 2,5 - heptadienes are obtained. When aqueous solutions of these acids react with metal oxides or hydroxides or ammonium or sulfonium hydroxides, the corresponding salts are obtained. Those salts which are insoluble in water precipitate and are recovered by filtration. The soluble salts are recovered by evaporation. Thus, when one of the 1,1-disubstituted-2,3,5,6-tetracyano-4,7-dithia-2,5-heptadienes, for example, 1,1,2,3,5,6-hexacyano-4,7-dithia-2,5-heptadiene, reacts in an aqueous solution with an oxide or hydroxide of $Li^+$, $Na^+$, $Mg^{++}$, $Al^{+++}$, $K^+$, $Ca^{++}$, $Ti^{++++}$, $Cr^{+++}$, $Mn^{++}$, $Fe^{++}$, $Fe^{+++}$, $Co^{++}$, $Co^{+++}$, $Ni^{++}$, $Ni^{+++}$, $Cu^{++}$, $Zn^{++}$, $Rb^+$, $Sr^{++}$, $Mo^{+++}$, $Ag^+$, $Cd^{++}$, $Sn^{++}$, $Cs^+$, $Ba^{++}$, $Hg^{++}$, $Pb^{++}$, or $Bi^{+++}$, the corresponding 1,1,2,3,5,6-hexacyano-4,7-dithia-2,5-heptadiene-1,7-diide salts are formed. The corresponding ammonium and trimethylsulfonium salts are similarly prepared.

The 1,1 - disubstituted - 2,3,5,6 - tetracyano-4,7-dithia-2,5-heptadienes and their salts are all colored compounds which are substantive to fibers, particularly to polyamide fibers, and are useful as dyes. This is illustrated as follows:

A solution of two parts of tetramethylammonium 1,1,2,3,5,6-hexacyano - 4,7 - dithia - 2,5-heptadiene-1,7-diide in about 20 parts of acetone is suspended in a solution of two parts of a sulfonated lignin dispersant in 20,000 parts of water. Fabric swatches of 66 nylon, rayon, and wool are suspended in this dye bath, and the bath is boiled for one hour. The swatches are then washed with soap and water, rinsed with water, and dried. By this treatment, the 66 nylon is dyed yellow, the rayon is dyed tan, and the wool is dyed yellow.

Since obvious modifications and equivalents in the invention will be evident to those skilled in the chemical arts, I propose to be bound solely by the appended claims.

The embodiments of the invention in which an exclusive property or privilege is claimed are defined as follows:

1. Compounds of the formula

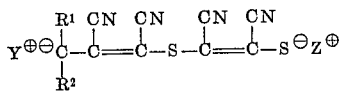

wherein $R^1$ and $R^2$ are selected from the group consisting of —CN, —COOR, —COR, —C$_6$H$_5$, —CNH$_2$=C(CN)$_2$, —NO$_2$ and —SO$_2$C$_6$H$_5$, R being a member of the group consisting of hydrogen and alkyl of up to 20 carbons, and Y and Z are cations selected from the group consisting of hydrogen, metals, ammonium, lower alkyl-substituted ammonium, sulfonium and lower alkyl-substituted sulfonium.

2. 1,1,2,3,5,6-hexacyano-4,7-dithia-2,5-heptadiene.
3. An alkali metal salt of 1,1,2,3,5,6-hexacyano-4,7-dithia-2,5-heptadiene.
4. A tetramethylammonium salt of 1,1,2,3,5,6-hexacyano-4,7-dithia-2,5-heptadiene.
5. An alkali metal salt of 1-ethoxycarbonyl-1,2,3,5,6-pentacyano-4,7-dithia-2,5-heptadiene.
6. An alkali metal salt of 1,1-di(benzenesulfonyl)-2,3,5,6-tetracyano-4,7-dithia-2,5-heptadiene.
7. The process which comprises reacting tetracyano-1,4-dithiin and an alkali metal derivative of a compound containing an active methylene group at a temperature between —80 and 300° C. and in the substantial absence of water.
8. The process which comprises reacting tetracyano-1,4-dithiin and sodiomalonitrile at a temperature between —80 and 300° C. and in the substantial absence of water.
9. The process which comprises reacting tetracyano-1,4-dithiin and a sodium salt of ethyl cyanoacetate at a temperature between —80 and 300° C. and in the substantial absence of water.
10. The process which comprises reacting tetracyano-1,4-dithiin and a sodium salt of bis(benzenesulfonyl)methane at a temperature between —80 and 300° C. and in the substantial absence of water.
11. The process which comprises passing a 2,3,5,6-tetracyano-4,7-dithia-2,5-heptadiene-1,7-diide, in which the 1,1-positions are substituted by members of the group consisting of —CN, —COOR, —COR, —C$_6$H$_5$, —CNH$_2$=C(CN)$_2$, —NO$_2$ and —SO$_2$C$_6$H$_5$, R being a member of the group consisting of hydrogen and alkyl of up to 20 carbons, in liquid phase through a cation exchange resin in the acid form and thereby producing a 2,3,5,6-tetracyano-4,7-dithia-2,5-heptadiene, said diide being a member of the group consisting of metal, ammonium, lower alkyl-substituted ammonium, sulfonium and lower alkyl-substituted sulfonium salts of the heptadiene.
12. The process which comprises passing a 1,1,2,3,5,6-hexacyano-4,7-dithia-2,5-heptadiene-1,7-diide in liquid phase through a cation exchange resin in the acid form and thereby producing 1,1,2,3,5,6-hexacyano-4,7-dithia-2,5-heptadiene, said diide being a member of the group consisting of metal, ammonium, lower alkyl-substituted ammonium, sulfonium and lower alkyl-substituted sulfonium salts of the heptadiene.
13. The process which comprises passing tetramethylammonium 1,1,2,3,5,6-hexacyano-4,7-dithia-2,5-heptadiene-1,7-diide in liquid phase through a cation exchange resin in the acid form and thereby producing 1,1,2,3,5,6-hexacyano-4,7-dithia-2,5-heptadiene, said diide being a member of the group consisting of metal, ammonium, lower alkyl-substituted ammonium, sulfonium and lower alkyl-substituted sulfonium salts of the heptadiene.

References Cited in the file of this patent

UNITED STATES PATENTS

| 2,533,233 | Edwards et al. | Dec. 12, 1950 |
| 2,766,270 | Engelhardt et al. | Oct. 9, 1956 |
| 2,809,972 | Middleton | Oct. 15, 1957 |

FOREIGN PATENTS

| 568,646 | Canada | Jan. 6, 1959 |

OTHER REFERENCES

Bergmann: "Acetylene Chemistry," page 80, 1948. (Copy in Sci. Library.)